United States Patent
Evraets et al.

(10) Patent No.: US 9,114,336 B2
(45) Date of Patent: Aug. 25, 2015

(54) OIL-FILTRATION SYSTEM WITH OIL/AIR SEPARATION FOR AUTOMATED FOOD-FRYERS

(75) Inventors: Eric J. Evraets, Mukwonago, WI (US); Thomas L. Oberlin, Brookfield, WI (US)

(73) Assignee: Oberlin Filter Company, Waukesha, WI (US)

( * ) Notice: Subject to any disclaimer, the term of this patent is extended or adjusted under 35 U.S.C. 154(b) by 318 days.

(21) Appl. No.: 13/351,629

(22) Filed: Jan. 17, 2012

(65) Prior Publication Data

US 2013/0183421 A1  Jul. 18, 2013

(51) Int. Cl.
*A23D 9/04* (2006.01)
*B01D 29/09* (2006.01)
*C11B 3/00* (2006.01)
*C11B 3/16* (2006.01)
*B01D 29/84* (2006.01)

(52) U.S. Cl.
CPC .............. *B01D 29/09* (2013.01); *B01D 29/843* (2013.01); *C11B 3/008* (2013.01); *C11B 3/16* (2013.01)

(58) Field of Classification Search
CPC ........ B01D 45/12; B01D 46/42; B01D 19/00; B01D 19/0021; B01D 19/0057; B04C 2009/002; B04C 5/02; B04C 5/00; A23D 9/00; A47J 37/12; A47J 37/1214; A47J 37/1223
USPC ............ 55/385.1, DIG. 36; 96/234, 262, 265, 96/272, 273, 275, 322, 323, 355, 356, 357, 96/361, 177, 195, 208, 209, 216; 126/299 R, 299 F; 99/330, 403, 407, 99/408, 410; 137/393; 210/167, DIG. 8, 210/188, 787, 788, 512.1, 295, 167.28; 95/261

See application file for complete search history.

(56) References Cited

U.S. PATENT DOCUMENTS

| | | | | |
|---|---|---|---|---|
| 3,221,635 A | * | 12/1965 | Hill, Jr. ...................... | 126/299 E |
| 3,368,682 A | * | 2/1968 | Boots ............................ | 210/121 |
| 3,608,472 A | * | 9/1971 | Pelster et al. .................... | 99/327 |
| 3,616,909 A | * | 11/1971 | Lowrey et al. ................. | 210/788 |
| 3,649,290 A | * | 3/1972 | Angold ......................... | 426/296 |
| 3,685,433 A | * | 8/1972 | Cunningham ................. | 99/408 |
| 3,735,693 A | * | 5/1973 | Pelster et al. ................... | 99/408 |
| 3,751,885 A | * | 8/1973 | McNeely ........................ | 96/242 |
| 3,762,394 A | * | 10/1973 | Newcomer .................... | 126/300 |

(Continued)

FOREIGN PATENT DOCUMENTS

| | | | |
|---|---|---|---|
| GB | 2307650 | * | 6/1997 |
| WO | WO92/22236 | * | 12/1992 |

*Primary Examiner* — Duane Smith
*Assistant Examiner* — Adam W Bergfelder
(74) *Attorney, Agent, or Firm* — Jansson Munger McKinley and Shape Ltd.

(57) ABSTRACT

A cooking-oil filtration system and method for automated food-fryers with a solids-removing filter for cleaning cooking oil from the food-fryer which includes and involves an oil/air separator for receiving air-containing oil from the filter and then returning air-separated oil to the food-fryer. In certain highly preferred embodiments the oil/air separator includes a cylindrical inner wall and an inlet conduit configured for tangential entry and spiral flow of oil. In another embodiment, the oil/air separator is a surge tank having upper and lower tank upper portions and conduits facilitating the in-flow of air-containing oil and the gravity out-flow of air-separated oil to the food-fryer. In-flow is preferably driven by a pump upstream of the filter media.

13 Claims, 4 Drawing Sheets

(56) References Cited

U.S. PATENT DOCUMENTS

| | | | | |
|---|---|---|---|---|
| 3,837,269 A | * | 9/1974 | Sweet et al. | 126/299 E |
| 4,053,291 A | * | 10/1977 | Sims | 96/209 |
| 4,068,571 A | * | 1/1978 | Cunningham | 99/408 |
| 4,084,492 A | * | 4/1978 | Sullivan | 99/330 |
| 4,519,904 A | * | 5/1985 | Helmick | 210/167.28 |
| 4,539,898 A | * | 9/1985 | Bishop et al. | 99/336 |
| 4,551,255 A | * | 11/1985 | Miller | 210/770 |
| 4,622,135 A | * | 11/1986 | Williams | 210/167.28 |
| 4,724,807 A | | 2/1988 | Walker | |
| 4,732,081 A | * | 3/1988 | Sakuma | 99/407 |
| 4,785,725 A | * | 11/1988 | Tate et al. | 99/330 |
| 4,787,972 A | * | 11/1988 | Stubblebine | 210/196 |
| 4,826,590 A | * | 5/1989 | Turman | 210/98 |
| 4,913,922 A | * | 4/1990 | Hawkes et al. | 426/417 |
| 4,957,520 A | * | 9/1990 | Parmentier et al. | 96/136 |
| 4,962,698 A | * | 10/1990 | Drijftholt et al. | 99/408 |
| 5,049,264 A | * | 9/1991 | Rosnack et al. | 210/117 |
| 5,133,786 A | * | 7/1992 | Anderson | 95/141 |
| 5,179,891 A | * | 1/1993 | Chiu | 99/408 |
| 5,203,253 A | * | 4/1993 | Covington et al. | 99/357 |
| 5,243,898 A | * | 9/1993 | Sakuma | 99/408 |
| 5,247,876 A | * | 9/1993 | Wilson et al. | 99/408 |
| 5,277,109 A | * | 1/1994 | Muench | 100/112 |
| 5,419,240 A | * | 5/1995 | Morishita et al. | 99/404 |
| 5,423,979 A | * | 6/1995 | Allen | 210/167.07 |
| 5,524,607 A | * | 6/1996 | Grohman et al. | 126/299 R |
| 5,556,000 A | * | 9/1996 | Covington et al. | 221/150 A |
| 5,558,080 A | * | 9/1996 | Grohman et al. | 126/299 D |
| 5,755,965 A | * | 5/1998 | Reiber | 210/512.1 |
| 5,811,006 A | * | 9/1998 | Ford | 210/512.1 |
| 5,814,115 A | * | 9/1998 | Allen et al. | 55/350.1 |
| 5,904,751 A | * | 5/1999 | Van Niekerk | 95/212 |
| 6,019,825 A | * | 2/2000 | Greene et al. | 96/209 |
| 6,095,037 A | * | 8/2000 | Savage et al. | 99/408 |
| 6,202,543 B1 | * | 3/2001 | Moya et al. | 99/330 |
| 6,235,210 B1 | * | 5/2001 | Saksena | 210/791 |
| 6,254,790 B1 | * | 7/2001 | King et al. | 210/767 |
| 6,348,087 B1 | | 2/2002 | Aslin | |
| 6,372,129 B1 | * | 4/2002 | Moody | 210/181 |
| 6,485,535 B1 | | 11/2002 | Linnersten et al. | |
| 6,585,790 B2 | | 7/2003 | Linnersten et al. | |
| 6,783,685 B2 | * | 8/2004 | Hwang | 210/690 |
| 6,797,025 B2 | | 9/2004 | Linnersten et al. | |
| 6,818,046 B1 | * | 11/2004 | Lowry | 96/194 |
| 6,895,957 B2 | * | 5/2005 | Yeung | 126/299 E |
| 7,025,890 B2 | * | 4/2006 | Moya | 210/788 |
| 7,332,004 B2 | * | 2/2008 | Jackson | 55/350.1 |
| 7,488,378 B2 | * | 2/2009 | Van Den Berghe | 96/408 |
| 7,566,468 B1 | * | 7/2009 | Oberlin et al. | 426/330.6 |
| 7,867,310 B2 | | 1/2011 | Baten | |
| 7,938,959 B1 | * | 5/2011 | Inman et al. | 210/167.28 |
| 7,993,425 B2 | | 8/2011 | Corattiyil et al. | |
| 8,287,630 B2 | * | 10/2012 | Li | 96/234 |
| 2002/0006460 A1 | * | 1/2002 | Hwang | 426/438 |
| 2002/0035931 A1 | * | 3/2002 | Tschopp et al. | 99/408 |
| 2002/0174776 A1 | * | 11/2002 | Nockermann et al. | 99/330 |
| 2003/0106292 A1 | * | 6/2003 | Kitano et al. | 55/396 |
| 2004/0040903 A1 | * | 3/2004 | Burke et al. | 210/172 |
| 2004/0058043 A1 | * | 3/2004 | More | 426/438 |
| 2004/0159243 A1 | * | 8/2004 | Theodos | 99/330 |
| 2009/0255411 A1 | * | 10/2009 | Takahashi | 99/407 |
| 2010/0116345 A1 | * | 5/2010 | Florkey et al. | 137/1 |
| 2013/0193044 A1 | * | 8/2013 | Coco | 210/167.28 |
| 2013/0193084 A1 | * | 8/2013 | Vogt | 210/774 |

* cited by examiner

OIL-FILTRATION SYSTEM WITH OIL/AIR SEPARATION FOR AUTOMATED FOOD-FRYERS

FIELD OF THE INVENTION

The invention relates generally to oil-filtration systems and methods for removing solids from cooking oil in industrial food-frying operations and, more particularly, to oil-filtration systems in automated, continuous industrial food-frying operations.

BACKGROUND OF THE INVENTION

During industrial food-frying operations, solids accumulate in the cooking oil. In high-quality food-frying operations, oil-filtration systems are employed as part of the equipment in order to remove solids from the frying oil and thus prolong the life of the cooking oil.

A variety of filtration systems are used in the food industry. One exemplary filtration system of the sort to which the present invention applies uses automatically replaced filter media and pump pressure to force solids-containing oil from the food-fryer through the filter media. Then, intermittently, i.e., after accumulation on the filter media of a filter cake of solids, the system applies air pressure in a "drying" step to remove as much oil as reasonably possible from the filter cake on the filter media (in order to reduce loss of oil), after which a new portion of filter media is moved into position and the "dried" cake of filtered-out solids from the cooking oil is discarded.

This and other generally similar types of oil-filtration systems for use in industrial food-frying have many advantages. However, certain shortcomings and problems exist related to air in the cooking oil, and it is to overcoming these and related problems that the present invention is addressed.

More specifically, systems such as described above have problems related to the presence of air entrained in the cooking oil. Air in the cooking oil is caused, or made more problematic, by the use of air pressure to drive filtered cooking oil out of the filter cake that has progressively accumulated on the filter media during filtration. During the "drying" phase of operation, in which air pressure is applied on and through the accumulated solids cake and filter media (on which the cake has accumulated) to drive cooking oil from the cake and filter for return to the food-frying vat itself, an air surge eventually occurs as the air breaks through the filter cake. This air surge into the return oil flow increases the quantity of air entrained in the filtered oil returning to the food-fryer and causes potentially hazardous turbulence, even splash risks. Turbulence can be a significant safety problem, considering that most food-fryers maintain cooking-oil temperatures of between about 275° F. and 415° F. Further, turbulence can stir up solids in the fryer which then may attached to the food and affect both taste and appearance. (Such solids are typically removed from the bottom of the fryer by settling to the bottom and being removed by a slow-moving conveyor.) Turbulence can also interfere with proper spacing of food objects being cooked, e.g., pieces of chicken, in the food-fryer.

Furthermore, air in cooking oil, however it might get there, can be deleterious to the food-frying operations. The oxygen content of the air naturally increases oxidation of the oil, and thus causes increased degradation of the oil. In other words, even beyond the turbulence problems referred to above, it is problematic to food-frying operations to have air entrained in the cooking oil, and it would be considered highly desirable to minimize the amount of air entrained in the cooking oil.

Moreover, returning filtered oil from cooking-oil filtration apparatus back to the food-fryer itself without in any way affecting the cooking operations can be problematic. Some possible ways of addressing such problems could involve complex equipment and multiple pumps, but this would increase service requirements and attendant operational costs.

There has been a continuing need for an efficient, safe and simple solution to all of the above-described problems in oil-filtration systems for industrial food-fryers.

OBJECTS OF THE INVENTION

It is an object of the invention to provide an improved oil-filtration system and method for use in continuous, industrial food-frying operations.

Another object of this invention is to provide an improved oil-filtration system overcoming some of the problems and shortcomings of the prior art, including those described above.

Another object of this invention is to improve and make more efficient and effective industrial food-frying equipment.

More specifically, a major object of this invention is to address the problems associated with air entrained in cooking-oil in automatic food-fryer operations.

Still more specifically, an object of this invention is to solve problems associated with air surges in the stream of oil after oil-filtration in automatic food-frying equipment.

In particular, one object of this invention is to eliminate potentially hazardous turbulence and oil splashing in food-frying equipment.

Another object of this invention is to avoid the problem of spacing of food objects being cooked in automatic, industrial food-fryers.

Still another object of this invention is to provide equipment minimizing degradation of the quality of cooking oil used in industrial, high-volume food-fryers.

Yet another object of this invention is to accomplish the above objectives in a system that avoids complex equipment with moving parts and/or multiple pumps, and thus provide improved oil-filtration systems which minimize service and the costs of operation.

How these and other objects are accomplished will become apparent from the following descriptions and the figures.

BRIEF SUMMARY OF THE INVENTION

The invention is an improved cooking-oil filtration system for automated food-fryers of the type that include a solids-removing filter for cleaning cooking oil from the food-fryer. The improvement in such filtration systems involves an oil/air separator that receives air-containing oil from the filter, and after oil/air separation returns the air-separated oil (oil after air removal) to the food-fryer.

In highly preferred embodiments, the oil/air separator includes a housing having a cylindrical inner wall that extends from a wall upper portion thereof to a wall lower portion thereof, and an inlet conduit configured to direct the air-containing oil tangentially onto the wall upper portion to create a spiraling flow of the air-containing oil which drives the air in the air-containing oil radially inward and from there out of the oil to produce the air-separated oil.

Such embodiments preferably include a pump which drives air-containing oil from the filter to the separator and into the separator through the inlet conduit. Such pump is preferably upstream of the filter. The oil/air separator preferably includes an oil-outlet conduit at the lower end of the housing configured to return the air-separated oil to the food-fryer by gravity. An air-outlet conduit is preferably included at the upper end of the housing of such oil/air separator. And such air-outlet conduit preferably extends to the hood above the food-fryer.

The cooking-oil filtration system of this invention preferably includes a pressure filter which has replaceable filter media from which oil is substantially removed (prior to filter media replacement) by air pressure from a compressed air source.

Another embodiment of this invention has a pump, preferably upstream of the filter, which drives air-containing oil from the filter and to the oil/air separator, and the oil/air separator includes a surge tank. The surge tank has a tank upper portion and a tank lower portion, an inlet conduit at the tank upper portion configured to direct air-containing oil into the surge tank, and an oil-outlet conduit at the lower end of the tank configured to return the air-separated oil to the food-fryer by gravity. In preferred embodiments, the oil/air separator includes an air-outlet conduit at the upper end of the tank, which preferably extends to the hood above the food-fryer.

This embodiment of the invention, like the embodiment with spiral flow first described above, provides in effect a flow "buffer" to isolate the food-fryer from the turbulence caused by a surge of air breaking through the filter cake.

While key embodiments of the invention are improved cooking-oil filtration systems, the invention is also cooking-oil oil/air separation apparatus for cooking-oil filtration systems. The invention is also a method of separating air from air-containing cooking oil downstream of a cooking-oil filter of a food-fryer cooking system that includes a cooking-oil flow path for circulating cooking oil through the filter. The inventive method includes directing pump-driven air-containing cooking oil from downstream of the filter into a separator vessel, the separator vessel providing an expanded portion to the cooking-oil flow path apart from the fryer, the filter and connecting conduits thereof, and returning air-separated oil by gravity from the separator vessel to the food-fryer. In preferred embodiments, the separator vessel has a cylindrical inner wall extending from a wall upper portion thereof to a wall lower portion thereof and the directing step includes directing the air-containing oil tangentially onto the wall upper portion, thereby creating spiraling flow of the air-containing oil, driving the air therein radially inward and out of the oil to produce the air-separated oil for return to the food-fryer.

All of the objects of the invention are provided by the present invention.

BRIEF DESCRIPTION OF THE DRAWINGS

In FIG. 2A, the filter is in normal filtration mode. In FIG. 2B, the filter is in discharge mode during which the filter medium and filter aid are replaced.

DETAILED DESCRIPTIONS OF PREFERRED EMBODIMENTS

The present invention is an improvement of a cooking-oil filtration system for automated food-fryers which have a solids-removing filter for cleaning cooking oil from the food-fryer. An embodiment of one such system is described in U.S. Pat. No. 7,566,468 (Oberlin et al.) entitled "Oil Filtration Process" which issued on Jul. 28, 2009 and is incorporated herein in its entirety. The embodiments of the present invention now to be described in detail will be described as improvements of systems employing a flatbed pressure filter type that is commercially available from Oberlin Filter Company of Waukesha, Wis.

Figure 1:
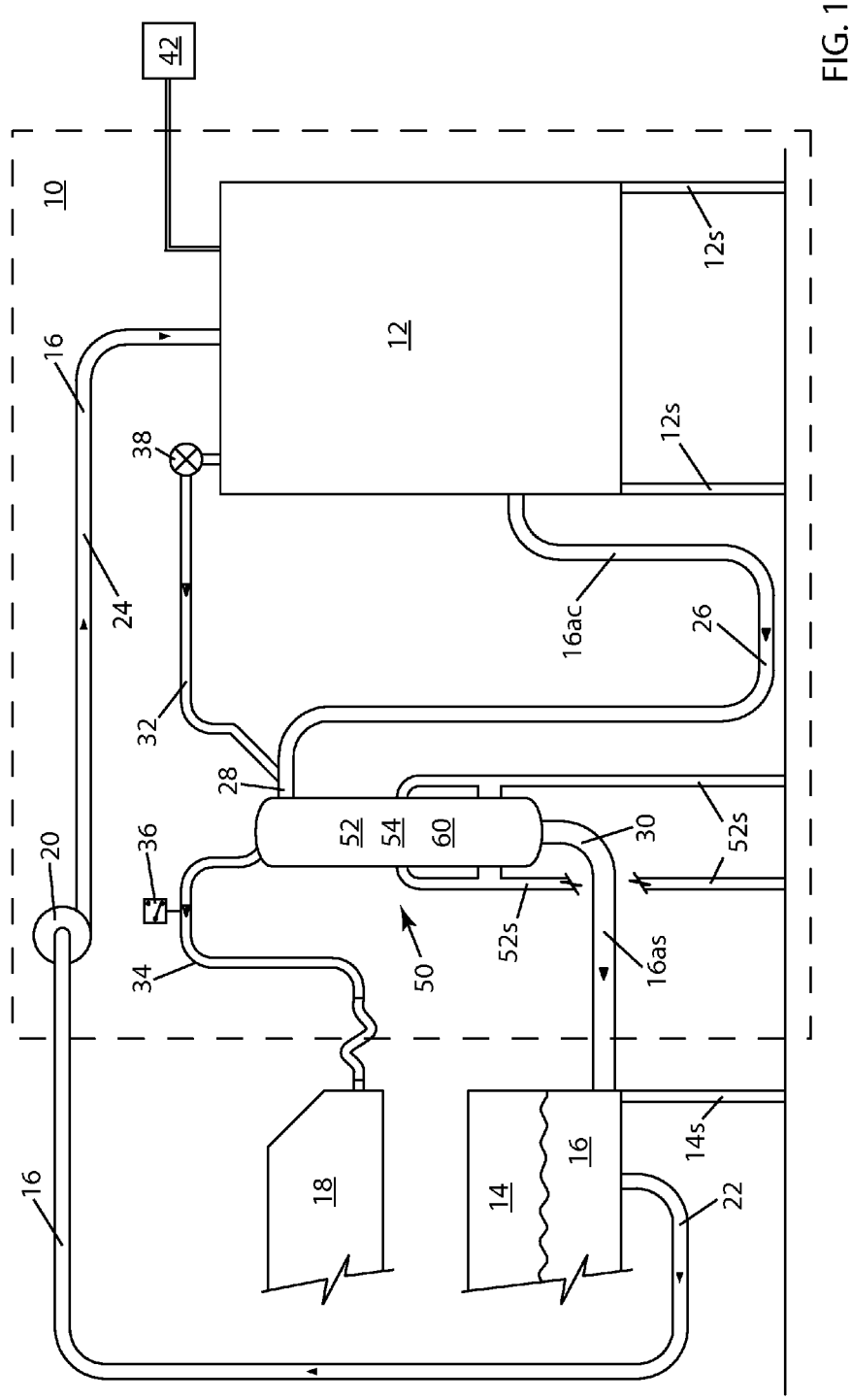
FIG. 1 is a schematic diagram of an embodiment of the improved cooking-oil filtration system for automated food-fryers, the improvement comprising an oil/air separator.

FIG. 1 is a schematic diagram of an embodiment of the improved cooking-oil filtration system 10 for an automated food-fryer 14. Improved cooking-oil filtration system 10 of FIG. 1 incorporates an oil/air separator 50 for separating air from the cooking oil 16 which is being circulated within filtration system 10.

In this embodiment, filtration system 10 includes cooking-oil filter 12 which is an automated solids-removing filter. A cooking-oil pump 20 circulates cooking oil 16 from a food fryer 14, through a fryer outlet conduit 22 and a filter inlet conduit 24 to filter 12. Pump 20 further moves cooking oil 16 through filter 12 and on to separator 50 through a filter outlet conduit 26. Cooking oil 16 may become mixed with air in filter 12, and cooking oil 16 leaving filter 12 through conduit 26 is also referred to as air-containing oil 16*ac*. The air in air-containing oil 16*ac* is separated from cooking oil 16 in separator 50, and the resulting air-separated oil 16 as is returned by gravity to fryer 14 through oil-outlet conduit 30.

Pump 20 may be one of a number types of pumps including, for example, a centrifugal pump or an air-operated diaphragm pump. Whatever type of pump is employed, pump 20 must be able to withstand the high operating temperature of cooking oil 16.

Figure 2A:
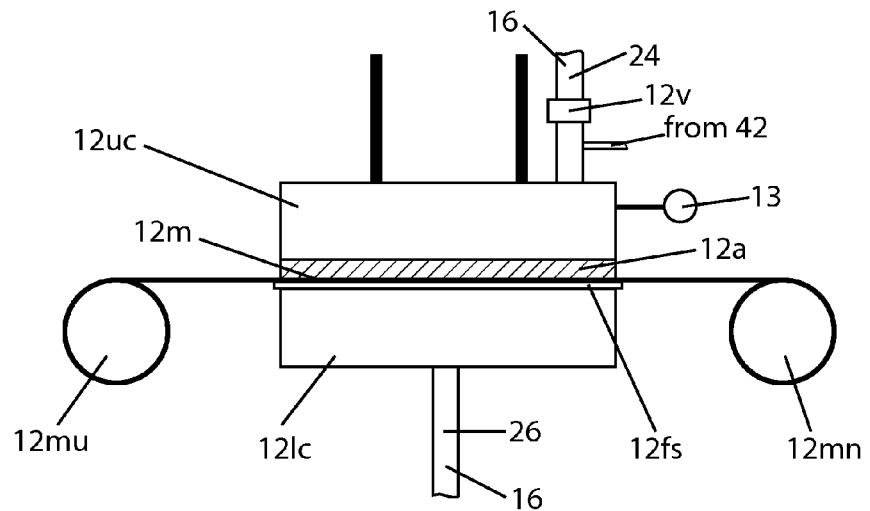
FIGS. 2A and 2B are schematic illustrations depicting the operation of the flatbed pressure filter in the embodiment of the filtration system of FIG. 1.
Figure 2B:
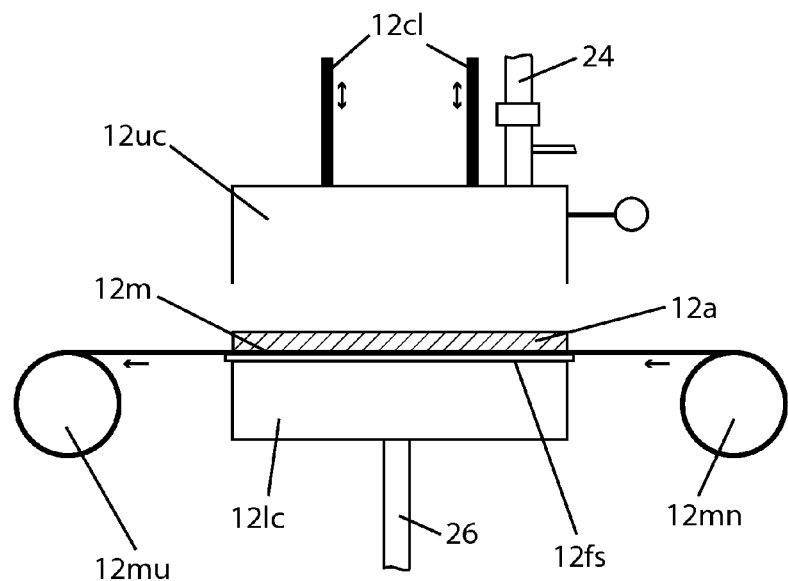

Referring to FIGS. 2A and 2B for more detail of the configuration and operation of filter 12, filter 12 is a flatbed pressure filter. Filter 12 utilizes a filter aid 12*a* and a replaceable filter medium 12*m* which during filtering operation is sealed in a horizontally-oriented upper filter chamber 12*uc* over a lower filter chamber 12*lc*. Filter aid 12*a* is a material added to oil 16 in filter 12 to create a filter cake (also referred to by reference number 12*a*) on filter medium 12*m*. Filter medium 12*m* and filter cake 12*a* together provide the filtering properties of filter 12.

Filter media 12*m* can be a filter cloth, a filter paper or any other media capable of retaining filter aid 12 *a* and the impurities in cooking oil 16. Most preferably, a highly-efficient non-woven filter fabric is used so that only one pass through filter 12 is necessary to remove all of the solids in oil 16 and to enable the added filter aid 12*a* to be removed from oil 16 and to easily form a filtering layer (filter cake 12*a*) on filter medium 12*m*. Typically, filter medium 12*m* is capable of retaining particles of size down to one micron.

Filter aid 12*a* may be a passive filter aid material such as diatomaceous earth or an active filter aid such as an adsorbing, purifying agent like magnesium silicate. Other additives may be included to enhance the quality of oil 16 and food product being processed, including, for example, activated carbons, alumina, bleaching materials, silicates, silicas, and silica gels. The horizontal nature of flatbed pressure filter 12 facilitates easy formation and maintenance of filter cake 12*a*.

Oil 16 containing solids from fryer 14 is pumped into upper filter chamber 12uc, and filter aid 12a collects onto filter medium 12m on a filter substrate 12fs. Filter substrate 12fs supports filter medium 12m and filter cake 12a over lower filter chamber 121c. Filtered air-containing oil 16ac flows through filter cake 12a and filter medium 12m into lower filter chamber 121c and out of filter 12 through filter outlet conduit 26 to separator 50.

The operation of filter 12 is cyclical. During operation, a section of filter medium 12m and filter cake 12a formed on it is discharged from filter 12 when the pressure drop across the filter chamber indicates that the section has become fully loaded with removed solids. A portion of this discharge cycle is illustrated in FIG. 2B. Filter upper chamber 12uc is raised by a filter chamber lift 12c1. During this portion of the cycle, a new section of filter medium is placed into position in filter 12 while spent filter medium 12m and filter cake 12a are removed from filter 12. Filter medium 12m is supplied from a roll of new filter media 12mn and is taken up onto a roll of used filter media 12mu.

A pressure sensor 13 measures the pressure drop across filter cake 12a and filter medium 12m during normal filter operation. An increase in pressure drop to a predetermined level triggers the start of a "drying cycle" which removes excess oil 16 from filter medium 12m and filter cake 12a prior to discharge of filter cake 12a and the introduction of a new section of filter media 12mn. Such new section of filter medium 12m is automatically and quickly positioned in filter 12, and a fresh batch of filter aid 12a is introduced to form then a new filter cake 12a as normal filtering operation resumes.

In cooking-oil filtration system 10, it is this "drying cycle" which is the primary source of the air in air-containing oil 16ac. Air may be introduced into cooking oil 16 in several ways such as turbulence in fryer 14 or other such incidental mechanism. However, during such drying cycle, compressed air from a compressed air source 42 is used to drive a substantial portion of cooking oil 16 which is in filter medium 12m and filter cake 12a at the time the drying cycle is triggered due to the pressure drop reaching its predetermined level. During drying, a filter valve 12v closes off the flow of cooking oil 16 into filter 12. This drying cycle therefore creates significant opportunity for air being introduced into oil 16. After the drying portion of the cyclical operation of filter 12 is complete, the cycle continues on to the discharge portion of the cycle. Further details of an embodiment of filter 12 are shown in U.S. Pat. No. 7,566,468 which has been incorporated herein by reference.

Another significant opportunity for air to be introduced into air-containing oil 16ac occurs at the end of the drying cycle when most of oil 16 in filter medium 12m and filter cake 12a has been driven out by the compressed air. At this point, a surge of air can occur in the flow from filter 12 to separator 50.

Figure 3:
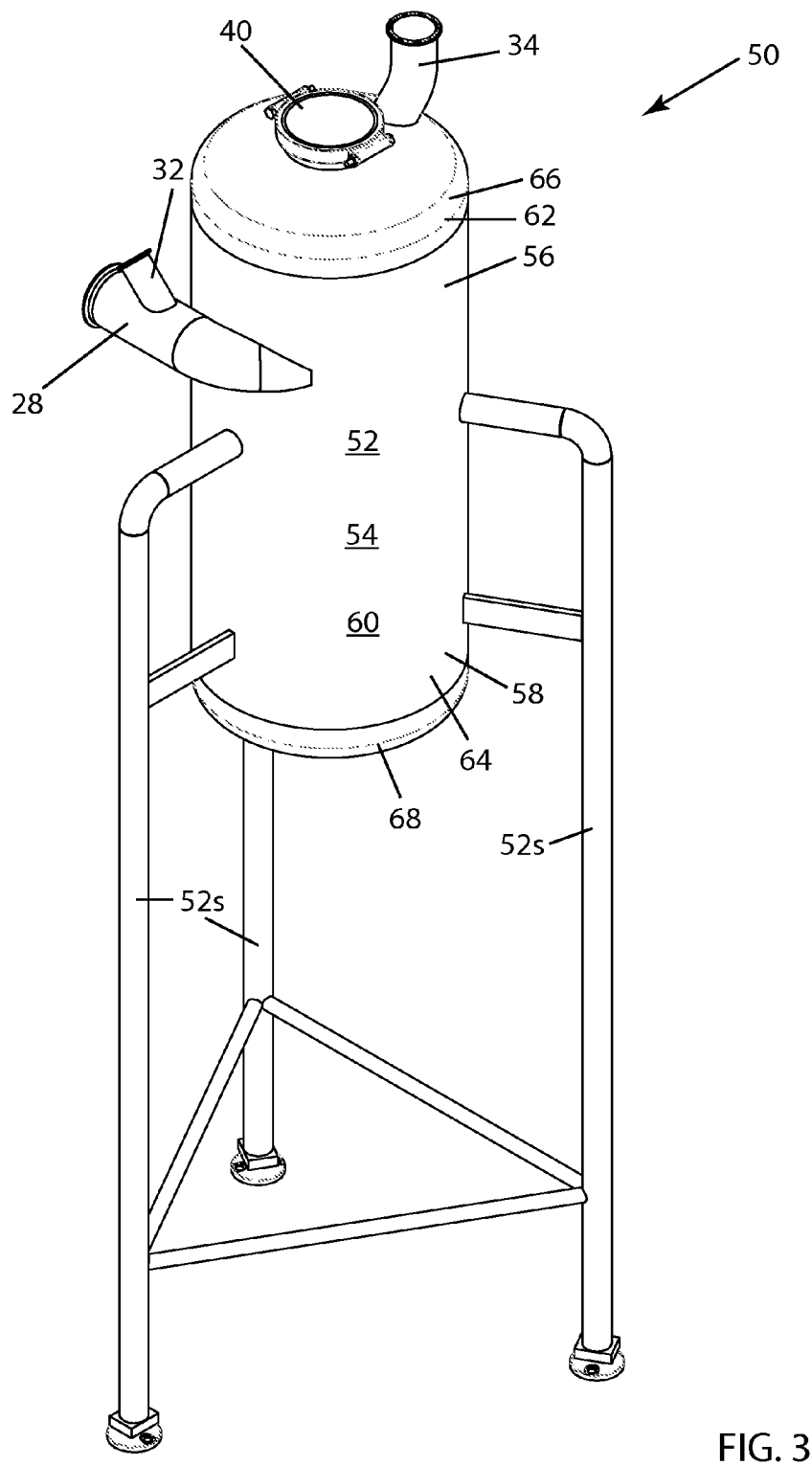
FIG. 3 is a perspective drawing of an embodiment of an oil/air separator of the system of FIG. 1 for receiving air-containing cooking oil from a filter and returning air-separated oil to a food-fryer.
Figure 4:
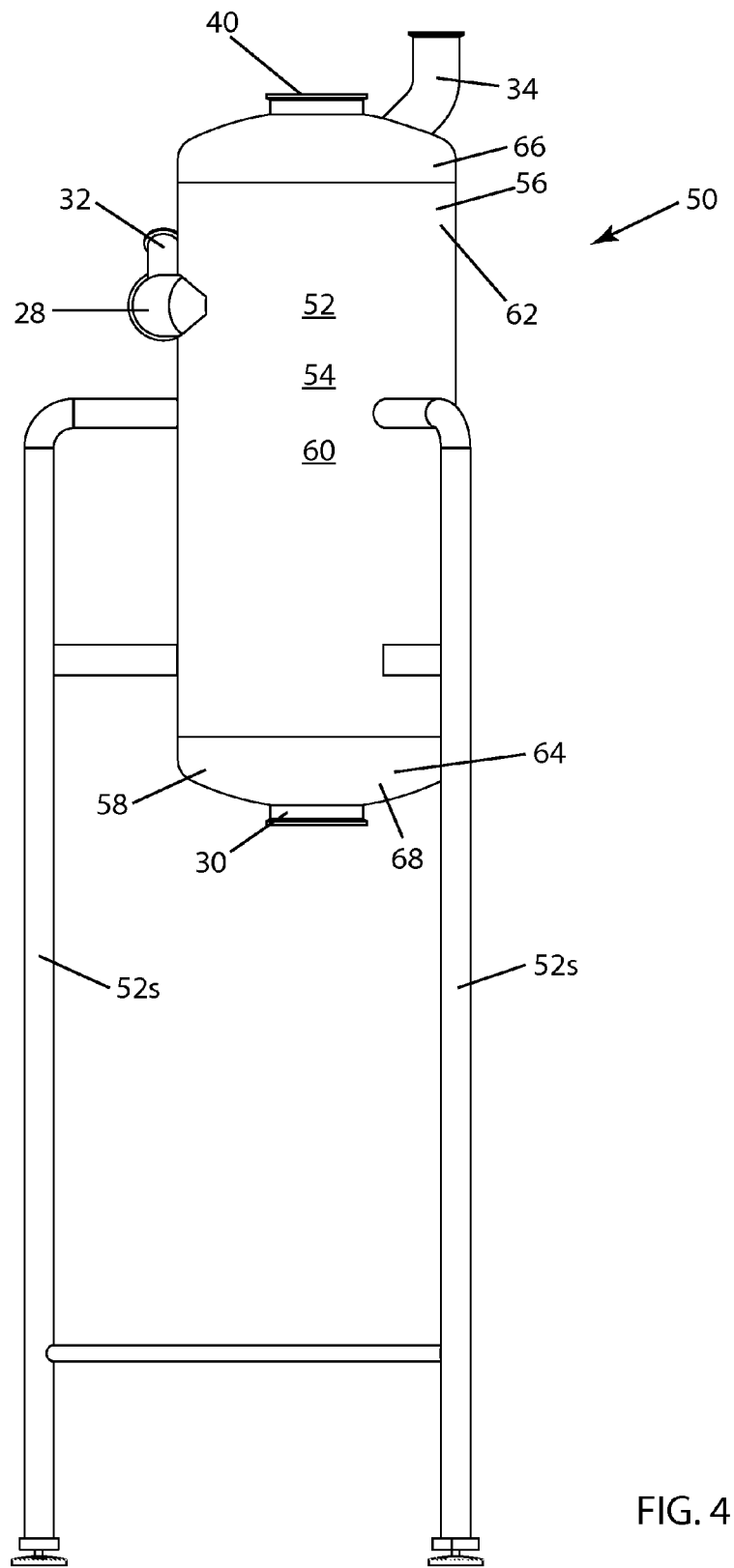
FIG. 4 is a side elevation drawing of the oil/air separator embodiment of FIG. 3.

Referring particularly to FIGS. 3 and 4 which illustrate an embodiment of separator 50 in more detail, separator 50 includes a separator housing 52 supported by three housing supports 52s. Separator 50 is installed on supports 52s in order to elevate separator 50 appropriately above fryer 14 to facilitate gravity-driven flow of air-separated oil 16as from separator 50 to fryer 14. Housing 52 is a cylindrical tank having a cylindrical inner wall 54. Cylindrical housing is also a surge tank 60. Reference numbers 52, 54 and 60 are all shown on the same component of separator 50 since housing 52 is also surge tank 60 and since housing 52 is cylindrical and includes cylindrical inner wall 54 with no internal structure. Inner wall 54 and portions of inner wall 54 are indicated externally in the figures.

Cylindrical inner wall 54 of housing 52 extends from a wall upper portion 56 of inner wall 54 to a wall lower portion 58 of inner wall 54. Air-containing oil 16ac, driven by pump 20 through filter 12, enters separator 50 through filter outlet conduit 26 and inlet conduit 28. Inlet conduit 28 is located and oriented to direct flow tangentially onto an upper wall portion 56 of inner wall 54. Air-containing oil 16ac flows in a spiral path down and along inner wall 54 from upper wall portion 56 to lower wall portion 58, driving the air in air-containing oil 16ac radially inward and out of air-containing oil 16ac to produce air-separated oil 16as. The spiral flow of air-containing oil 16ac along inner wall 54 creates a pressure gradient in air-containing oil 16ac which, because air is much less dense than oil 16, drives the air radially inward and oil 16 radially outward, thus separating air from air-containing oil 16ac. The flow along inner wall 54 also creates flow with significant surface area providing opportunity for the air to find its way to this surface and to escape from air-containing oil 16ac.

Oil/air separator 50 includes oil-outlet conduit 30 at a lower end 68 of housing 52. Oil-outlet conduit 30 returns air-separated oil 16as to fryer 14 by gravity. Air which has been separated from air-containing oil 16ac passes out of separator 50 through an air-outlet conduit 34 at an upper end 66 of housing 52 into a fryer hood 18 positioned over fryer 14. A high level switch 36 prevents oil 16 from overflowing into hood 18.

During operation of cooking-oil filtration system 10, some air-separated oil 16as may rise in surge tank 60 (housing 52) to an equilibrium level at lower end 68 of surge tank 60. This equilibrium level serves to smooth out the flow of air-separated oil 16as from separator 50 to fryer 14 if flow of air-containing oil 16ac into separator 50 is somewhat uneven. Further, during a surge of air into separator 50 from filter 12 which can occur at the end of a drying cycle, the volume of surge tank 60 facilitates separation of such large amounts of air from air-containing oil 16ac. The surge of air is prevented from reaching fryer 14. This effect is assisted by the equilibrium level of air-separated oil 16as at lower end 68 of surge tank 60.

Cooking-oil filtration system 10 also includes a bleed-off conduit 32 with a bleed-off valve 38. Bleed-off valve 38 is closed during most of the normal cycle 12 except at the end of the drying cycle, at which point bleed-off valve 38 is opened temporarily to release any residual pressure in filter 12 prior to the removal and replacement of the filter media section and filter aid replenishment.

Separator 50 also includes an access port 40 at upper end 66 of surge tank 60 (housing 52). Access port 40 is not used during normal operation of separator 50.

Separator 50 and generally all components in cooking-oil filtration system 10 are fabricated of stainless steel.

While the principles of the invention have been shown and described in connection with specific embodiments, it is to be understood that such embodiments are by way of example and are not limiting.

The invention claimed is:

1. In a cooking-oil filtration system for automated food-fryers which has a solids-removing filter for cleaning cooking oil from the food-fryer and an oil/air separator continuously receiving air-containing oil from the filter and continuously returning air-separated oil to the food-fryer, the improvement wherein the oil/air separator includes:

a housing having a cylindrical inner wall extending from a wall upper portion thereof to a wall lower portion thereof; and an inlet conduit configured to direct the air-containing oil tangentially onto the wall upper portion, thereby creating spiraling flow of the air-containing oil, driving the air therein radially inward and out of the oil to produce the air-separated oil.

2. The cooking-oil filtration system of claim 1 further including a pump driving air-containing oil from the filter and through the inlet conduit.

3. The cooking-oil filtration system of claim 2 wherein the pump is upstream of the filter.

4. The cooking-oil filtration system of claim 1 wherein the oil/air separator includes an oil-outlet conduit at the lower end of the housing configured to return the air-separated oil to the food-fryer by gravity.

5. The cooking-oil filtration system of claim 1 wherein the oil/air separator includes an air-outlet conduit at the upper end of the housing.

6. The cooking-oil filtration system of claim 1 wherein the food-fryer has a hood and the air-outlet conduit extends to the hood.

7. The cooking-oil filtration system of claim 1 wherein the filter is a pressure filter having replaceable filter media from which oil is substantially removed prior to media replacement by air pressure from a compressed air source.

8. The cooking-oil filtration system of claim 1 with a pump to drive the air-containing oil from the filter and to the separator, the separator including:

a surge tank having a tank upper portion and a tank lower portion;

an inlet conduit at the tank upper portion configured to direct air-containing oil into the surge tank; and an oil-outlet conduit at the lower end of the tank configured to return the air-separated oil to the food-fryer by gravity.

9. The cooking-oil filtration system of claim 8 wherein the pump is upstream of the filter.

10. The cooking-oil filtration system of claim 8 wherein the oil/air separator includes an air-outlet conduit at the upper end of the tank.

11. The cooking-oil filtration system of claim 10 wherein the food-fryer has a hood and the air-outlet conduit extends to the hood.

12. The cooking-oil filtration system of claim 8 wherein the filter is a pressure filter having replaceable filter media from which oil is substantially removed prior to media replacement by air pressure from a compressed air source.

13. A method of separating air from air-containing cooking oil downstream of a cooking-oil filter of a food-fryer cooking system that includes a cooking-oil flow path for continuously circulating cooking oil through the filter, including the steps of:

continuously directing pump-driven air-containing cooking oil from downstream of the filter into a separator vessel having a cylindrical inner wall extending from a wall upper portion thereof to a wall lower portion thereof, the separator vessel providing an expanded portion to the cooking-oil flow path apart from the fryer, the filter and connecting conduits thereof, the continuous directing step including directing the air-containing oil tangentially onto the wall upper portion, thereby creating spiraling flow of the air-containing oil by driving the air therein radially inward and out of the oil to produce the air-separated oil for return to the food-fryer; and returning air-separated oil by gravity from the separator vessel to the food-fryer.

\* \* \* \* \*

UNITED STATES PATENT AND TRADEMARK OFFICE
CERTIFICATE OF CORRECTION

PATENT NO.         : 9,114,336 B2  
APPLICATION NO.    : 13/351629  
DATED              : August 25, 2015  
INVENTOR(S)        : Evraets et al.

Page 1 of 1

It is certified that error appears in the above-identified patent and that said Letters Patent is hereby corrected as shown below:

At column 4, line 34, delete "16 as" and insert --16as--.
At column 5, line 15, delete "12c1" and insert --12cl--.
At column 6, line 31, delete "16 as" and insert --16as--.
At column 6, line 34, delete "16 as" and insert --16as--.
At column 6, line 41, delete "16 as" and insert --16as--.

Signed and Sealed this  
Ninth Day of February, 2016

Michelle K. Lee  
*Director of the United States Patent and Trademark Office*